United States Patent [19]

Hiscox et al.

[11] Patent Number: 5,158,577
[45] Date of Patent: * Oct. 27, 1992

[54] PROCESS FOR PRECIPITATING ALUMINA FROM BAYER PROCESS LIQUOR

[75] Inventors: Bryan A. Hiscox; Charles D. Ellis, both of Dollard; Jacques E. Larocque, Jonquiere, all of Canada; Denis R. Audet, Raheen, Ireland

[73] Assignee: Alcan International Limited, Montreal, Canada

[*] Notice: The portion of the term of this patent subsequent to Apr. 7, 2009 has been disclaimed.

[21] Appl. No.: 665,340

[22] Filed: Mar. 6, 1991

Related U.S. Application Data

[63] Continuation-in-part of Ser. No. 480,059, Feb. 14, 1990, Pat. No. 5,102,426.

[51] Int. Cl.$^5$ ............................................. B01D 9/02
[52] U.S. Cl. .................................... 23/301; 423/625; 423/629; 423/121; 423/127; 23/305 A
[58] Field of Search ............... 423/121, 123, 124, 127, 423/625, 629; 23/301, 305 A

[56] References Cited

U.S. PATENT DOCUMENTS

| | | | |
|---|---|---|---|
| 2,707,669 | 5/1955 | Houston et al. | 423/124 |
| 3,486,850 | 12/1969 | Day | 423/127 |
| 3,649,184 | 3/1972 | Featherson | 423/629 |
| 4,234,559 | 11/1980 | Tschamper | 423/629 |
| 4,305,913 | 12/1981 | Anjier | 423/123 |
| 4,311,486 | 1/1982 | Yamada | 423/629 |
| 4,512,959 | 4/1985 | Pohland et al. | 423/121 |
| 4,614,642 | 9/1986 | Cristol et al. | 423/121 |
| 4,617,179 | 10/1986 | Veyrier | 423/121 |

FOREIGN PATENT DOCUMENTS

| | | | |
|---|---|---|---|
| 3219288 | 6/1983 | Fed. Rep. of Germany | 423/629 |
| 49-004696 | 1/1974 | Japan | 423/629 |
| 55-051720 | 4/1980 | Japan | 423/629 |

Primary Examiner—Michael Lewis
Assistant Examiner—Ngoc-Yen M. Nguyen
Attorney, Agent, or Firm—Cooper & Dunham

[57] ABSTRACT

An improved process for precipitating alumina from Bayer process liquors is disclosed. The process involves dividing an incoming pregnant liquor stream into a minor portion of about 10 to about 25% by volume of the total incoming pregnant liquor stream, and directing that stream into a series of small tanks where the minor stream is permitted to agglomerate. Fine aluminum hydroxide seed having a median particle size of between about 30 and about 60 microns is added to this stream. The slurry resulting from the agglomeration stage is then directed to a set of larger vessels in which the growth stage will take place. At this point, the remaining portion of the pregnant liquor is combined with the slurry resulting from the agglomeration stage. A coarse seed charge of about 150 to about 600 grams/liter of seed having a median particle size of between about 80 and about 100 microns is charged into the second set of vessels. This improved process helps to increase the yield of a strong coarse aluminum trihydroxide product.

9 Claims, 3 Drawing Sheets ic
PROCESS FOR PRECIPITATING ALUMINA FROM BAYER PROCESS LIQUOR This application is a continuation-in-part of U.S. patent application Ser. No. 480,059, filed Feb. 14, 1990, now U.S. Pat. No. 5,102,486.

BACKGROUND OF THE INVENTION

1. Field of the Invention

This invention relates to a process for precipitating aluminum trihydroxide from Bayer process liquors, and more particularly to improvements in the Bayer process which help to increase the yield of alumina and the size of alumina particles retrieved from Bayer process liquors. The invention also relates to improved apparatus for increasing the yield and size of alumina particles obtained in the Bayer process.

2. Description of the Prior Art

Various attempts have been made to increase the yield and particle size of the alumina recovered from Bayer process liquors in the more than 100 years since the invention of the Bayer process.

Recent attempts at improvements have included modifying various aspects of the process including dividing the incoming pregnant liquor stream into more than one part and supplying one part to a series of tanks known as the agglomeration section, and the remainder of the stream to a second series of tanks known as the growth section.

For example, a process described in U.S. Pat. No. 4,311,486 (Yamada) divides the incoming flow into two portions, and adds from 30 to 150 grams/liter of seed having a particle size of less than 10 microns to the agglomeration section, and from 30 to 150 grams/liter of coarse seed wherein at least 10% by weight of grains passing through a 325-mesh Tyler sieve is used in the growth section.

Another approach, contained in U.S. Pat. No. 4,614,642 (Cristol), also involves dividing the incoming pregnant liquor into two parts. According to that patent, 700 grams/liter of ungraded seed should be added to the agglomeration stage, and no seed should be added to the growth stage of the process.

Still other efforts have been made to improve yield and particle size in the Bayer process. U.S. Pat. No. 4,305,913 (Anjier), U.S. Pat. No. 4,234,559 (Tschamper), and U.S. Pat. No. 4,617,179 (Veyrier), each disclose attempts to solve the foregoing problems based upon adjustments to the various steps in the Bayer process.

None of the foregoing techniques, however, has been entirely successful in increasing yield and particle size of the alumina recovered from the Bayer process liquors.

SUMMARY OF THE INVENTION

It is a principal object of the invention to obtain high yields of alumina of large particle size from Bayer process liquor.

To this and other ends, the invention broadly contemplates the provision of improvements in a process for precipitating aluminum trihydroxide from Bayer process pregnant liquor including the steps of dividing an incoming stream of the pregnant liquor into a major portion and a minor portion; adding to only the minor portion a first particle size fraction of aluminum trihydroxide particles as seed for inducing precipitation of aluminum trihydroxide; passing only the minor portion, containing the first seed fraction, through a first reaction circuit comprising at least one vessel under conditions for inducing precipitation and agglomeration of aluminum trihydroxide particles from the liquor, the particles thus precipitated and agglomerated being carried from the first circuit in the minor portion of the stream; beyond the first circuit, reuniting the minor portion with the major portion to provide a recombined stream; adding to the recombined stream a second particle size fraction of aluminum trihydroxide particles as seed for inducing precipitation of aluminum trihydroxide, the second seed fraction being larger than the first seed fraction in median particle size; and passing the recombined stream, containing the second seed fraction, through a second reaction circuit comprising at least one vessel under conditions for inducing precipitation and growth of aluminum trihydroxide particles from the liquor, the particles thus precipitated and grown being carried from the second circuit in the recombined stream. More particularly, in accordance with the invention, in a first aspect thereof, the aforementioned minor portion of the incoming stream is not more than about 25% by volume of the total incoming stream.

In a further important aspect of the invention, the process involves providing a reaction circuit having a first series of vessels for carrying out the agglomeration stage and a second series or set of vessels for carrying out the growth stage of precipitation of alumina from Bayer process liquors. An incoming stream of pregnant liquor is divided into major and minor portions. The minor portion, which may comprise between about 10% and 25% by volume of the flow, is fed into the first series of tanks, and charged with a fine alumina seed. Preferably, the minor portion of the stream is charged with about 20 to about 110 grams/liter of fine seed having a median particle diameter of between about 30 to about 50 microns. The agglomeration phase of the precipitation process is preferably carried out in a short chain of small tanks to maintain a short residence time, from about 4 to about 12 hours. These are homogeneous tanks (with no solids accumulation in the vessels) and the slurry discharged to the growth section.

The remaining portion of the pregnant liquor is added to the second set of vessels in the system, called the growth section, together with a coarse seed charge of between 150-600 grams/liter, with the coarse seed having a median size of 80 to 100 microns. This charge of seed may be added directly, preferably as filtered moist hydrate to avoid the recirculation and the dilution effects of large spent liquor volume, or it may be provided by initially adding a small charge of seed, with the aluminum trihydroxide charge accumulated in the larger tanks by differential transfer of liquor and trihydroxide.

The major portion of liquor fed into the growth section of the series of vessels may be cooled, if necessary, to achieve a temperature of 50° C. to 70° C. (typically 55° C.–60° C.) in the first vessel of the growth section. The process continues in the chain of vessels for a normal residence time of 35 to 60 hours. Precipitation can be optimized by controlling the temperature in each vessel such that the temperature at the end of the vessel chain is 50° C. or less.

In yet other embodiments of the invention, two incoming streams of pregnant liquor are respectively treated in two parallel precipitation chains, in each of which the incoming stream is divided into a major portion and a minor portion for initial agglomeration of precipitated hydroxide particles only in the minor portion. i.e. in a first reaction circuit, with recombination of the major and minor portions in a second or growth reaction circuit, and recycling of produced particles from one chain to the other for use as seed so that the particles are exposed to fresh pregnant liquor several times after the initial agglomeration stage.

Another aspect of the invention involves an improved system for precipitating aluminum trihydroxide from Bayer process pregnant liquor. In one embodiment, the system includes the provision and interconnection of two parallel Bayer process circuits as described above so as to increase the yield and quality of alumina production. Each circuit in this particular embodiment includes a first series of vessels for carrying out an agglomeration stage of the Bayer process, a second series of vessels for carrying out a growth stage of the Bayer process and primary and secondary classifiers.

The residue from each of the second classifiers passes to a tertiary classifier stage which serves both the first and second reaction circuits. The system further includes means, such as piping, for feeding fine particles separated in the tertiary classifier to the first series of vessels in the second reaction circuit and means for feeding particles separated in the secondary classifier to the second series of vessels in the second reaction circuit. The system additionally includes means, such as a pipe, for feeding aluminum trihydroxide particles from the primary classifiers in the second circuit to the second series of vessels in the first circuit.

The invention further provides an improved process for precipitating aluminum trihydroxide from Bayer process pregnant liquor, including the steps of dividing an incoming stream of the pregnant liquor into a major portion and a minor portion, the minor portion being not more than 25% of the incoming stream; adding to only the minor portion a first particle size fraction of aluminum trihydroxide particles as seed for inducing precipitation of aluminum trihydroxide contained in the pregnant liquor. Next, the minor portion containing the added first seed fraction passes through a first reaction circuit comprising at least one vessel under conditions for inducing precipitation and agglomeration of aluminum trihydroxide particles from the liquor, the particles thus precipitated and agglomerated being carried from the first circuit in the minor portion of the stream. The major portion is reunited with the minor portion to provide a recombined stream and the recombined stream has a second particle size fraction of seed added for inducing precipitation of alumina. Preferably, the second seed fraction has a larger median particle size than the first seed fraction.

The recombined stream, containing the second seed fraction, passes through a second reaction circuit comprising at least one vessel under conditions for inducing precipitation and growth of aluminum trihydroxide particles from the liquor. The particles thus precipitated and grown are carried from the second circuit in the recombined stream. Beyond the second circuit, the aluminum trihydroxide particles are separated from the recombined stream into a coarse particle size portion, an intermediate portion and a fine particle size portion.

The improved process further comprises a second incoming stream of pregnant liquor into a major portion and a minor portion. The minor portion of the second stream has added thereto a first quantity of the coarse portion obtained above as seed. The minor portion of this second stream gets passed through a third reaction circuit similar to the first reaction circuit. The particles thus agglomerated are carried from the third circuit, reunited with the major portion of the second stream to provide a recombined second stream and then passed through a fourth reaction circuit similar to the second reaction circuit discussed above. As with the first stream, a second quantity of seed gets added to the second recombined stream. After the recombined stream leaves the fourth circuit, the coarse and intermediate aluminum trihydroxide particles are separated therefrom. The coarse particles are collected as product, and the intermediate particles get recycled to the fourth circuit as the second quantity of seed. The remainder of the recombined second stream gets combined with the recombined first stream to form a joint stream, and fine particles from the joint stream are added to the minor portion of the first stream in the first circuit.

The invention also contemplates the provision of a plurality of reaction circuits operating in parallel. Thus, each of the reaction circuits would have an agglomeration stage, a growth stage and first and second classifiers. The first, second, third and possibly fourth series of reaction circuits can have their streams rejoined or recombined beyond each of the second classifiers to feed the recombined streams to a common tertiary classifier. The improved system, although it takes up a large area, provides flexibility in that one or more of the parallel circuits may be operating simultaneously, depending on the desired throughput. In addition, the product of one circuit may serve as seed for the next circuit allowing several passes through the circuit to enable continued growth of the aluminum trihydroxide particles.

Further features and advantages of the invention will become evident upon consideration of the following detailed description in conjunction with the attached drawings.

DETAILED DESCRIPTION OF THE PREFERRED EMBODIMENT

Figure 1:
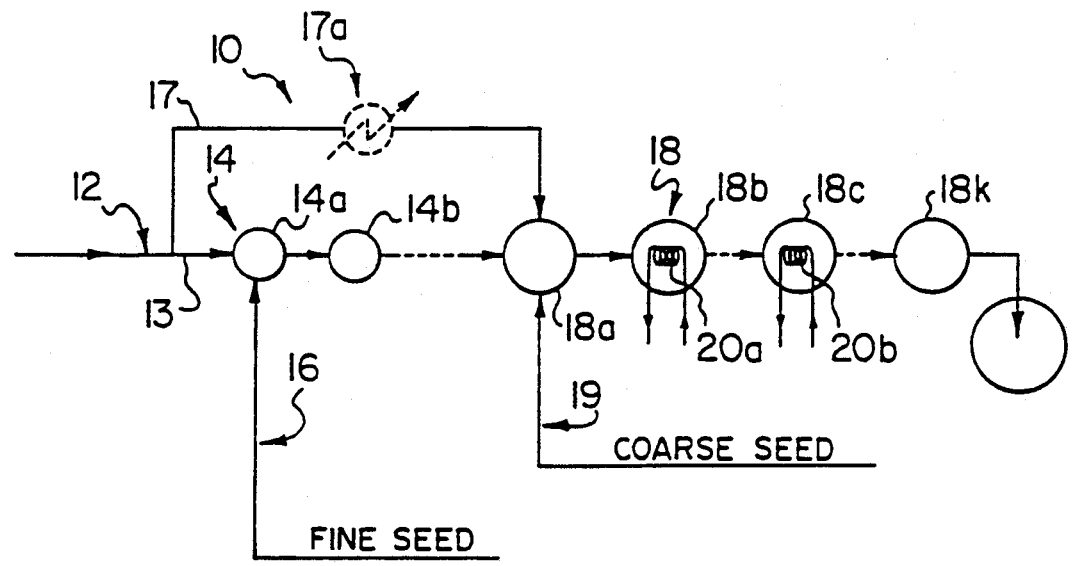
FIG. 1 is a schematic drawing of an illustrative embodiment of the process of this invention.

The basic principles of the Bayer process for removing alumina from bauxite ore have not changed in the more than 100 years which have elapsed since the original patent was granted. The Bayer process takes advantage of the reaction of the trihydrate and/or monohydrate of alumina contained in bauxite ore with aqueous caustic soda to form sodium aluminate. In a typical example of the Bayer process the following operations are performed in turn: (1) dissolution of the alumina at a high temperature; (2) separation and washing of insoluble impurities of bauxite (red muds) to recover the soluble alumina and caustic soda; (3) partial hydrolysis of sodium aluminate at a lower temperature to precipitate aluminum trihydroxide; (4) regeneration of the solutions for reuse by evaporation of the water introduced by the washing; and (5) calcination of the aluminum trihydroxide to anhydrous alumina.

For the purposes of this application, the term "Attrition Index" means a measure of the friability of alumina as determined by the industry standard Forsythe-Hertwig Attrition Test, described in *Ind. & Eng. Chem.*, Volume 41, page 1200.

The term "pregnant liquor" means a highly supersaturated solution of alumina and other impurities dissolved in sodium hydroxide. It has been filtered to remove solid inerts and impurities.

The term "caustic concentration" means the concentration of total sodium hydroxide in the solution in grams/liter, expressed as equivalent $Na_2CO_3$.

The term "fine seed" means aluminum trihydroxide crystals, typically $45\mu$ in diameter, which serve for the agglomeration section, upon which the dissolved alumina can precipitate.

The term "ratio" is the ratio of dissolved alumina expressed as g/L $Al_2O_3$: total caustic as g/L NaOH, but expressed in equivalent g/L $Na_2CO_3$.

The term % causticity =

$$\frac{\left(\begin{array}{c}\text{Conc'n of Total Caustic,}\\ \text{expressed as equiv. } Na_2CO_3\end{array}\right)}{\left(\begin{array}{c}\text{Conc'n of}\\ \text{Total Caustic}\end{array} + \begin{array}{c}\text{Conc'n of}\\ \text{Sodium Carbonate}\end{array}\right)} \times 100$$

A "draft tube agitator" is used to mix the contents of the precipitator tanks to prevent the solids from settling to the bottom. A draft tube agitator includes a large axial flow pump located at the top of a hollow column, called the "draft tube". The column is located in the center of the cylindrical tank and submerged below the liquid surface. The axial flow pump forces liquid down the draft tube, so that it impinges on the bottom of the tank and is forced upward in the annular space between the exterior wall of the tank and the draft tube to return to the pump after a cycle at 3-5 minutes. Such circulation will maintain a substantially uniform concentration of solids in the tank below the level of the top of the draft tube. Of course, other means of agitation to maintain a uniform concentration of solids may be used.

Preparatory to the digestion process, the bauxite may be dried and ground. Fine grinding helps ensure efficient extraction of the alumina. The drying ordinarily removes free water in the bauxite ore but leaves the water of hydration.

The digestion of bauxite with sodium hydroxide aims to dissolve as much as possible of the alumina, either as the monohydrate (boehmite) or trihydrate (gibbsite) in the shortest possible time and to produce a solution from which a maximum amount of alumina can be precipitated per unit volume. Digestions are usually performed in steel autoclaves or in tubular reactors. Heat exchangers recover much of the heat content of liquor leaving the reactor to heat liquor entering it.

The insoluble residues remaining after digestion are commonly known as red mud. They include iron oxides, sodium aluminum silicate, titanium oxide and other metal oxide impurities. The red muds may have a very fine particle size, making them difficult to separate and wash. These operations are usually accomplished by continuous countercurrent decantation with the dilute wash liquors being combined with the more concentrated pregnant liquors. After decantation, the pregnant liquors are normally submitted to a polishing filtration.

Once filtration is complete and the last traces of insoluble mud have been removed, the filtered liquors are cooled in preparation for precipitating their alumina content. To induce precipitation, aluminate liquor is seeded with seed obtained from previously precipitated crystals, and the mixture is agitated. The seed grows to an acceptable size and is then separated from the liquor.

The spent aluminate solution diluted by the water used to wash the mud prior to precipitation is reconcentrated in evaporation equipment. The aluminum trihydroxide from precipitation is filtered and washed, and the alumina is now ready to undergo calcination. Calcination changes the composition and crystalline structure of the alumina without changing particle shape.

European and American plants employ slightly different variations of the Bayer process. European plants use much higher caustic concentrations for digestion of bauxite ore. This more concentrated liquor requires less energy per unit volume of liquor circulated.

In the American process, use of a more dilute caustic solution results in production of larger particles, although at a somewhat lower yield.

The Bayer process as practiced in Europe and the United States has evolved over the years to satisfy the demands made by the continuous and ongoing development of the process. These demands now include:

1. High yield from the process liquor, to minimize the energy requirements of the process, and to maximize the production rate from existing facilities. In practice this implies precipitation from a caustic solution having a caustic concentration higher than previously considered normal for North American Bayer circuits—typically 150-200 gpl NaOH caustic expressed as $Na_2CO_3$—now 200-300 gpl.

2. Production of a coarse granular product, to minimize dusting and facilitate handling in subsequent phases of metal production—typically less than 10% −44 micron.

3. Production of a crystal with a morphology which is resistant to breakdown during and after rough treatment in modern fluid flash calciners. Typically a breakdown of less than 4% −44 micron during calcination, and an Attrition Index of less than 20 after calcination, are required.

4. Production of a material with a low total soda content, to match the low losses from modern dry-scrubbed long-life cells in the smelters, and to avoid excess bath generation. Typically, values of less than 0.40% $Na_2O$ (calcined basis) are now required.

To satisfy the foregoing demands, a precipitation circuit has been developed which is applicable principally but not exclusively to continuous precipitation circuits. The process of the present invention will now be explained with reference to the drawing.

FIG. 1 depicts schematically an example of a precipitation circuit for use in recovery of aluminum trihydroxide from Bayer process liquors generally designated with the reference numeral 10 for use in the process of the present invention. As schematically shown in FIG. 1, pregnant liquor is supplied through pipeline 12 to the precipitation circuit 10. The precipitation circuit 10 preferably includes a chain of up to 20, preferably 10–15 tanks or vessels, also called precipitators. The tanks include two sizes. Preferably 2–4 smaller tanks each of approximately 1100 m$^3$ capacity to provide a residence time of 2 hours each comprise the agglomeration stage of the precipitation circuit 10; the remaining tanks, comprising the growth stage, may each have a capacity of 4400 m$^3$ or more, to provide a residence time of 4 hours each. All these tanks or vessels are preferably provided with draft tube agitators (not shown), of generally conventional character and as such requiring no further description, to effect the requisite agitation of the liquor during the precipitation operation. The larger (growth stage) tanks may be fitted with weirs (not shown) to skim liquor from the top surface of the contents of the tank and cooling devices to remove heat from the contents.

The incoming pregnant liquor preferably has a temperature of between about 70° C. and about 85° C., with the typical temperature being about 75° C. The pregnant liquor usually and preferably has a concentration of about 150 grams/liter to about 300 grams/liter of total caustic and a ratio of about 0.6 through about 0.75 of dissolved alumina to total caustic. If, as is preferred, the concentration of caustic in the incoming pregnant liquor is about 250 grams/liter, the preferred ratio of the dissolved alumina to total caustic is about 0.70. Cooling of the incoming pregnant liquor may be accomplished in the plant heat exchange network prior to its admission to the precipitation section.

As the pregnant liquor approaches the precipitation or reaction circuit 10, a minor portion of the flow is directed through a pipeline 13 into a first series 14 of vessels 14a, 14b, etc., in which the agglomeration stage of the reaction takes place. Preferably, the minor portion comprises about 10 to about 25% of the total incoming pregnant liquor flow, typically 15 to 20%. The first (agglomeration stage) series 14 of vessels preferably should be a short chain of small tanks to maintain small residence time and hence high ratios. These tanks are homogeneous with no solids accumulation in the vessels, and the slurry is transferred from one tank to the succeeding tank in the chain.

The minor portion of the pregnant liquor introduced into the first series 14 of vessels is charged with fine seed of aluminum hydroxide crystals through pipeline 16. Preferably, about 20 to about 100 grams/liter of fine seed is added to this portion of the pregnant liquor. The fine seed should preferably have a median size of about 35 to about 50 microns, with 45 microns preferred. The minor portion of the flow is allowed to reside in the agglomeration section of the circuit for about 4 to 12 hours, with a typical residence time being 6 hours.

The remaining (major) portion of the pregnant liquor, which constitutes from about 75 to about 90% of the incoming pregnant liquor stream, is delivered through a pipeline 17 (bypassing the first series 14 of vessels) directly to the second (growth stage) series 18 of vessels 18a, 18b, 18c . . . 18k, which serve as containers for the growth stage of the process. The liquor thus fed to the second series 18 of vessels may be cooled as necessary (for example by optional cooling means schematically indicated as 17a, ahead of the first tank 18a). The minor portion of the liquor, after passing through the first series 14 of vessels, is also delivered (by means shown as pipeline 17b) to the first vessel 18a of the second series 18, where it rejoins the major portion of the liquor.

In the vessel 18a, as shown (or in the next successive vessel 18b), the liquor is charged through pipeline 19 with coarse seed having a median size of about 80 to about 100 microns, preferably 90 microns. The coarse seed charge should be between about 150 to about 600 grams/liter, preferably 400 grams/liter. The coarse seed charge may be added directly, as filtered moist hydrate, to avoid the recirculation and ratio dilution effects of a large volume of spent liquor. Alternatively, only a small charge of seed may be thus added, and the hydrate charge may be accumulated in the tanks by differential transfer of liquor and hydrate, as further described below.

For such differential transfer, the vessels of the second series 18 may be provided with weirs (not shown) or other means, such as by varying the ratio of underflow to overflow to retain aluminum trihydroxide solids, so that this concentration increases to e.g. 400 g/L. The weirs effect preferential retention of the larger trihydroxide particulates, while fines are entrained in the liquor passing from vessel to vessel of the series 18. Thus, in the vessel series 18, the fine material will be selectively advanced through the circuit 10 with the liquor streams, and thereby will advance quickly to the classification system, where (as is conventional) the fines are separated, being returned as seed through line 16 back to the agglomeration section of the process. This selective rapid circulation of fine particles favors the production of a coarse strong product in the circuit.

As shown schematically in FIG. 1, the treatment in vessel series 18 continues in a chain of vessels, to give nominal residence time for the feed flow in the second series 18 of tanks of about 30 to 60 hours. The precipitation rate is optimized in each vessel in the second series 18 by continuously cooling the slurry in a number of vessels to achieve an end of chain temperature of 50° C. or less. Preferably, the coolant in the earlier vessels of the second series 18 should be spent process liquor to conserve energy in the process. In subsequent tanks, the coolant can be cold water. That is to say, in the upstream vessels of series 18, cooling is effected by heat exchange between the liquor in the vessels and spent Bayer process liquor (which requires reheating for recirculation to the Bayer process extraction stage), while in the later or downstream vessels of series 18 cooling is effected by heat exchange between the liquor in the vessels and cold water. For convenience, this heat exchange arrangement is represented in the drawing by coils 20a (through which spent process liquor passes) and 20b (through which cold water passes).

The degree of cooling in each vessel of series 18 will be determined by the conditions of that particular system, and may depend on such factors as the natural heat loss to the environment. Any appropriate cooling device may be used.

After this precipitation process the slurry is fractionated into product, coarse seed, fine seed and spent liquor streams using any of the established techniques known to those of ordinary skill working in the aluminum industry, such as gravity sedimentation, elutriation, centrifugal separation by hydroclones, screening and sieving.

Figure 2:
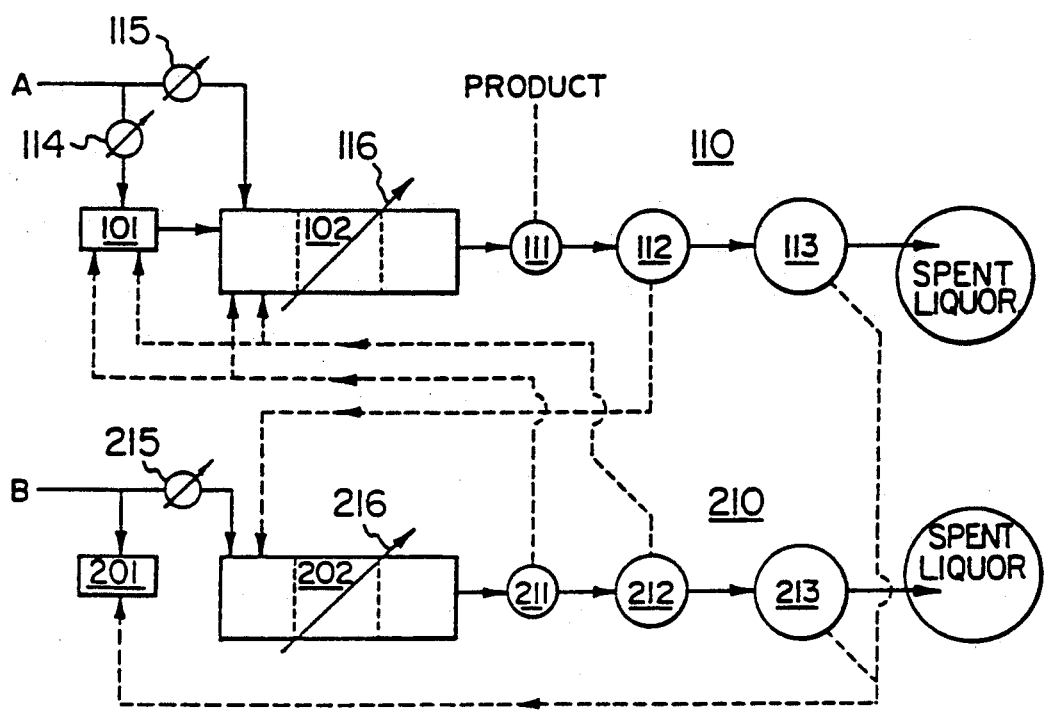
FIG. 2 is a schematic drawing of a further embodiment of the process of this invention.

In another embodiment of the invention, shown in FIG. 2, there are two parallel precipitation chains A and B, similar to those of the first embodiment shown in FIG. 1, and comprising for chain A a seed generation section 101, followed by a growth section 102, and at the end of the growth section a fractionation section 110 consisting of three separate stages to fractionate the product slurry into particles with different size ranges by means of primary 111, secondary 112 and tertiary 113 fractionators or classifiers. These classifiers produce respectively coarse particles, intermediate size particles and fine particles. For chain B, the agglomeration section is designated 201, the growth section 202, and the classification section 210; section 210 comprises the primary 211, secondary 212 and tertiary 213 classifiers, which fulfil the same classification functions as those on chain A.

A separate stream of fresh pregnant liquor is delivered to each of chains A and B (from the left-hand side of FIG. 2). The stream delivered to chain A is divided into a minor portion, which passes through agglomeration section 101 to growth section 102, and a major portion, which advances directly to growth section 102 without passing through section 101. Similarly, in chain B, the major portion of the entering pregnant liquor stream advances directly to the growth section 202 while a minor portion is diverted through agglomeration section 201 before rejoining the major portion in section 202. Cooling (by suitable means, such as heat exchangers) is provided at the locations indicated by symbols 114, 115 and 116 in chain A and 215 and 216 in chain B.

This arrangement of the invention is designed to produce particles which are larger and stronger than those which can be produced in the single chain precipitation. This is achieved by exposing the particles to fresh pregnant liquor several times after the initial agglomeration stage, to deposit successive layers of hydrate on the original agglomerated nucleus.

FIG. 2 illustrates this process. The smallest particles separated in the tertiary classifiers 113 and 213 of both chain A and chain B are sent to the agglomeration section 201 of chain B, where they act as fine seed. In contrast, the seed for the agglomeration section 101 of chain A is taken from the primary 211 or secondary 212 classifiers of chain B and the remainder of the product from these classifiers is used as seed for the growth section 102 of chain A. By judicious control of the seed charge and temperature profile in the A chain agglomeration section 101, it is possible to generate sufficient new fine particles to maintain the population balance of the circuit as a whole. The product of the primary classifier 111 of chain A, on the other hand, having been subjected to at least two cycles of growth after the initial agglomeration, first in chain B and then in chain A, has achieved a satisfactory size and strength and exits from the precipitation process as product. Finally, to close the system, the product from the secondary classifiers 112 of chain A, which is smaller than the desired product, is returned to chain B as seed for the growth section 202 of chain B. This material will then experience at least two further cycles of growth before reaching the product primary classifier 111 of chain A.

The two parallel chain circuit of FIG. 2 of the original application, generally operates in a "cross over" mode. In a further embodiment of the invention, shown in FIG. 3, the two parallel chains are designed to be operated without cross-over, which is easier to control than cross-over operation. The circuit of FIG. 3 provides a process which exposes the particles to fresh pregnant liquor several times after the initial agglomeration stage, to deposit successive layers of hydrate on the original agglomerated nucleus.

Figure 3:
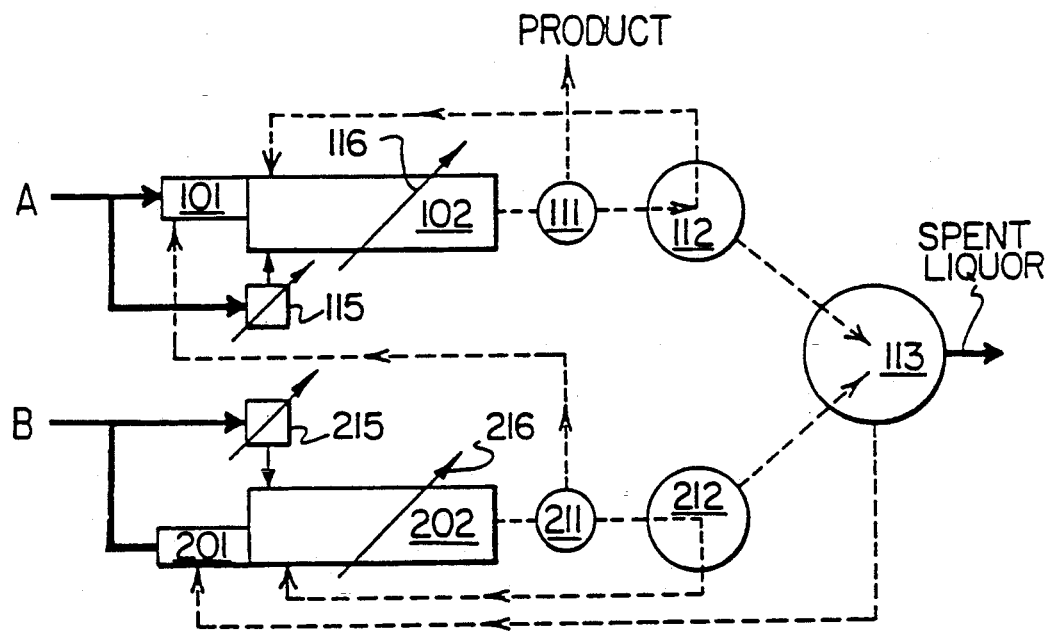
FIG. 3 is a schematic drawing of a still further embodiment of an apparatus for carrying out the process of the present invention.

FIG. 3 schematically illustrates the process and apparatus of this alternative preferred embodiment of the invention. The equipment used is similar to that shown in FIG. 2, and therefore the same numbering is used. To simplify the flow of solids in the circuit, the alternative embodiment diagrammed in FIG. 3 omits "cross over" of solids from secondary classifier 112 of chain A to the growth section 202 of chain B as takes place in the embodiment of FIG. 2. In the embodiment shown in FIG. 3 the small particles separated in the common tertiary classifier stage 113 for both chain A and chain B act as fine seed. The seed for the growth section 202 of chain B is taken from the secondary classifier 212 of chain B, whereas the seed for the agglomeration section 101 of chain A comes from the primary 211 classifier of chain B. The seed for the agglomeration section 101 of chain A comes from the primary 211 classifier of chain B. By judicious control of the seed charge and temperature profile in the A chain agglomeration section 101, one can generate sufficient new fine particles to maintain the population balance of the circuit as a whole. The product of the primary classifier 111 of chain A, on the other hand, having been subjected to at least two cycles of growth after the initial agglomeration stage, first in chain B and then in chain A, has achieved a satisfactory size and strength and exits from the precipitation process as product.

Finally, to close the system, the product from the secondary classifiers 112 of chain A, which is smaller than the desired product, is returned to chain A as seed for either the agglomeration section 101, or the growth section 102 of chain A. This material will then experience at least one further cycle of growth before reaching the product primary classifier 111 of chain A.

Figure 4:
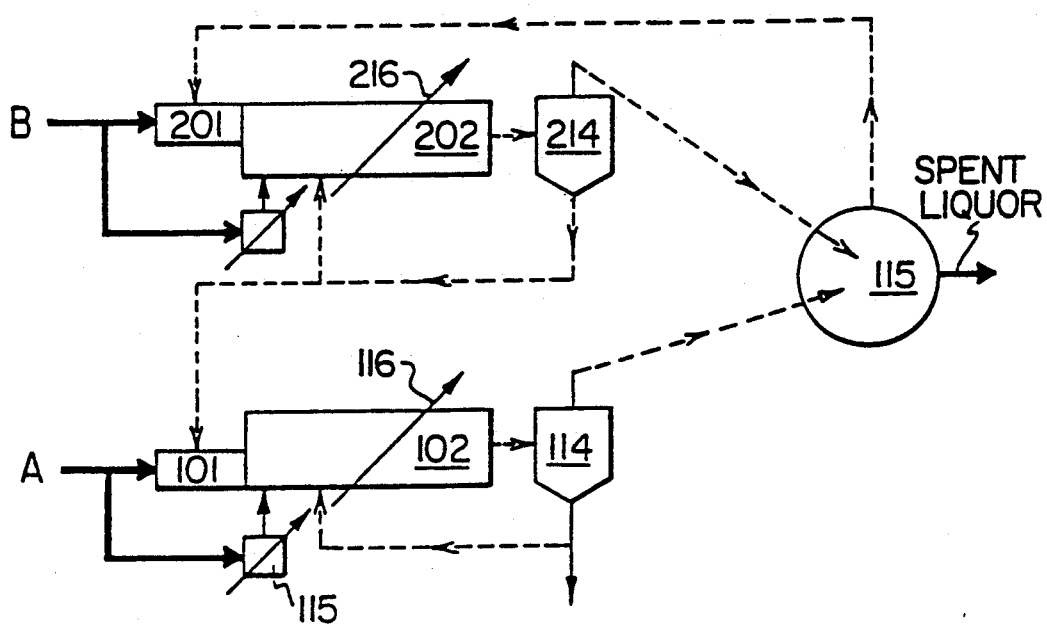
FIG. 4 is a schematic drawing of another embodiment of an apparatus for carrying out the process of the present invention.

A further embodiment of the invention involves a process similar to the one depicted in FIG. 3 in which the primary 111, 212 and secondary classifiers in each circuit A, B are replaced by a single hydrocyclone or hydroclone, illustrated schematically as reference numerals 114, 214 in FIG. 4, and well known to those of ordinary skill in the art. The hydrocyclone 114, 214 effects a size separation using centrifugal force generated as the fluid is forced into a rapidly moving vortex and spirals through the cone section of the hydrocyclone. The device delivers an underflow from the cone, containing the larger particles, and an overflow, delivered from the top of the device, which contains the smaller particles. The underflow contains particles whose size range is equivalent to the combined underflow of the primary and secondary classifiers, and exits from the triangular or cone shaped section 114a, 214a into pipe 120, 121. Pipe 120 directs the coarse particles from the cone shaped section 214a to agglomeration section 101 or growth section 202 while pipe 121 carries the coarse particles separated into hydrocyclone 114 to growth section 102 or to product pipeline 122 depending on particle size. The overflow exits from the top or flat section 114b, 214b of each hydrocyclone 114, 214 through pipes 126, 128. Also, this embodiment usually includes one tertiary classifier stage 113, which receives the overflow from hydrocyclones 214 and 114 and separates particles contained therein by sedimentation or filtration. The spent liquor exits through pipe 123 while the remaining fine particles return in pipe 124 to agglomeration section 124 where they comprise first particle (seed) fraction.

The operation of this circuit is substantially the same as that of the previously described circuits. The fine particles separated in the classifier 113 act as seed for the agglomeration section 201 of chain B, where they react with a minor flow of pregnant liquor. Upon exiting from this section 201, the resulting slurry is combined with the major portion of the flow, seeded with some of the coarser material contained in the underflow of hydrocyclone 214, and fed back to growth section 202 through pipe 120.

The slurry leaving growth section 202 passes through the hydrocyclone 214. The overflow, containing the fine particles continues on to classifier 113, while the coarser particles in the underflow get fed to the agglomeration section 101 of chain A. Upon exiting from agglomeration section 101, the resulting slurry joins the major flow, seeded with coarse particles from hydrocyclone 114, and is subjected to growth in growth section 102. The slurry exiting from growth section 102 is separated into the coarse particles found in the underflow, which constitutes the desired product, with the finer particles in the overflow, which is sent to the classifier 113.

Figure 5:
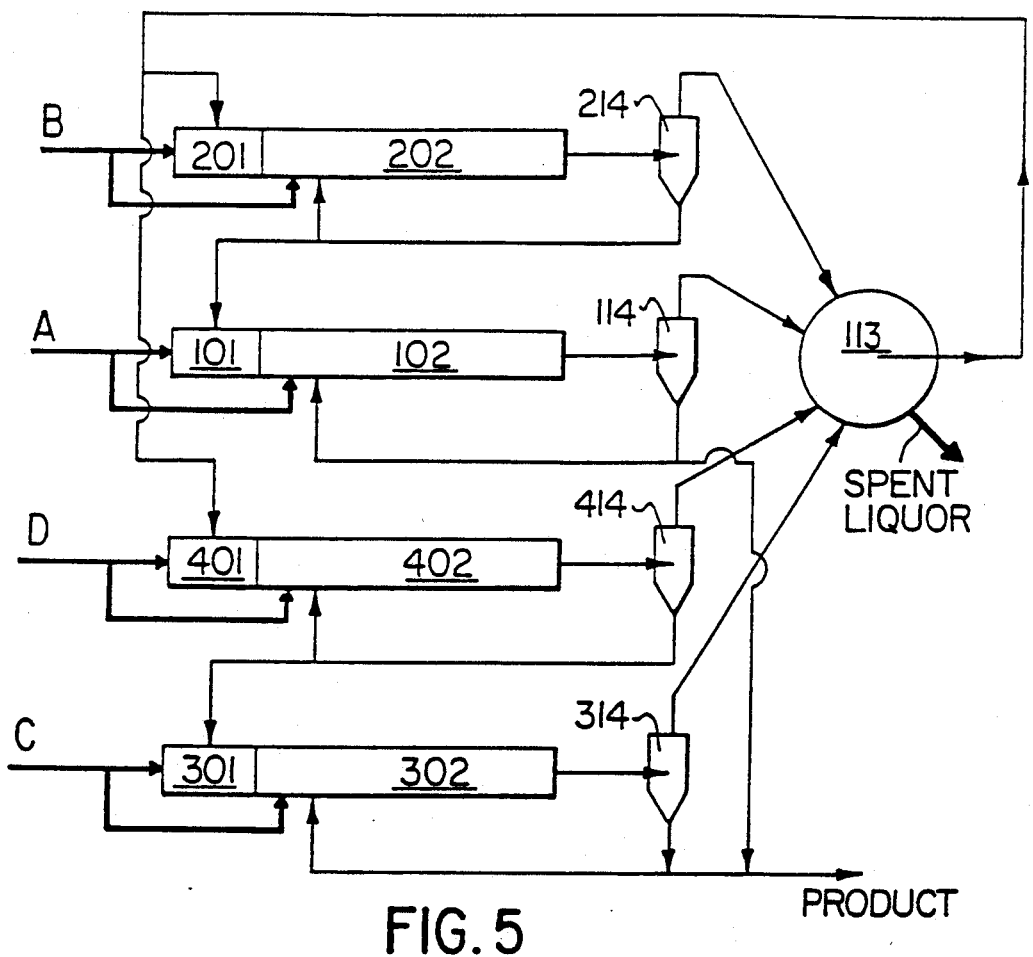
FIG. 5 is a schematic drawing of yet another embodiment of an apparatus for carrying out the process of the present invention.

The process of the present invention can also be operated in two or more series of interconnected parallel chains, using the apparatus configuration illustrated schematically in FIG. 5. This embodiment, a variation of the embodiment shown in FIG. 4, includes at least two pairs of chains operating in parallel and feeding into a single common tertiary classifier stage 113. In a broad sense, the invention contemplates the provision of a plurality of interlinked or interconnected Bayer process precipitation circuits A, B, C, D, . . . n. The degree and type of interconnection depends on available land, the type of available bauxite starting materials, and the characteristics of the desired end product, among other variables.

Referring now to the embodiment shown in FIG. 5, chain A includes an agglomeration section 101 which feeds into growth section 102 and then into a hydrocyclone 114, which separates large particles, permitting them to exit through bottom funnel 114a into pipe 120. Smaller particles are removed through top portion 114b through pipe 121 into classifier 113 which forwards the particles to agglomeration stage 201 (or possibly agglomeration stage 401 as explained below) through pipe 124, whereafter the particles continue to growth section 202, then to hydrocyclone 214 (including funnel 214a and top portion 214b which feeds into classifier 113) through pipe 126.

An additional pair of chains C and D are included in the system, as shown in FIG. 5. Chain C, essentially a replica of chain A, includes agglomeration section 301, followed by growth section 302, hydrocyclone 314 which separates product into funnel 314a and top portion 314b which in turn feeds into classifier 113 through pipe 130. Pipe 124a, an extension of pipe 124, carries particles back to agglomeration section 401. Likewise, chain D, a replica of chain B illustrated in the upper portion of FIG. 5, includes an agglomeration stage 401 which receives a stream of fresh pregnant liquor and a "recycled" particle stream returned from classifier 113 through an extension 124a of pipe 124. Beyond that, the particle stream passes into a further growth section 402 and then to hydroclone 414 which removes larger particles for further growth in growth section 302 of stage C through pipe 132, as shown in FIG. 5.

The embodiment depicted in FIG. 5 also takes advantage of the divided pregnant liquor stream improvement of the present invention, discussed above in more detail in connection with FIGS. 1 and 2. As shown in FIG. 5, each of the first stages of the four parallel precipitation systems has a first input pipe 140 for feeding a minor portion, usually not more than 25 percent, of the pregnant liquor stream into respective growth or agglomeration stages 101, 201, 301, 401. Moreover, each of the four parallel precipitation systems has a second inlet pipe 142 which feeds the major portion of the Bayer process liquor to the growth sections 102, 202, 302, and 402.

The operation of the embodiment of FIG. 5 resembles parallel operation of two circuits similar to those described and illustrated in connection with FIG. 2.

Figure 6:
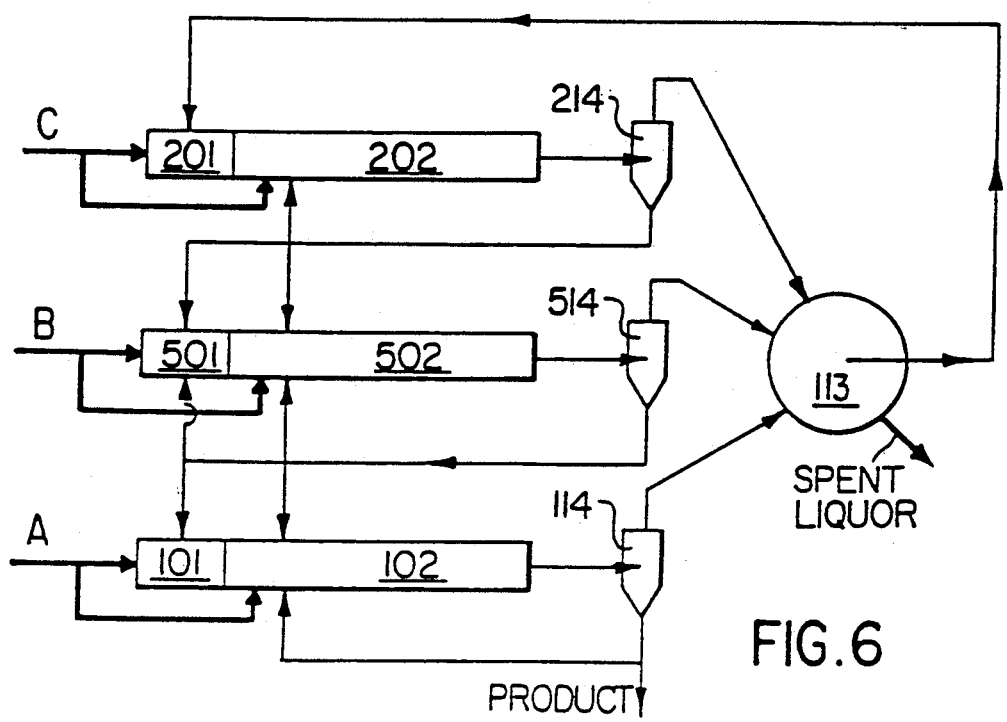
FIG. 6 is a schematic drawing of a still another embodiment of an apparatus for carrying out the process of the present invention.

The process of the present invention can be operated in still another embodiment of the invention having three parallel chains A, B and C, as shown in FIG. 6. Again, only one common classifier stage 113 serves each of the three hydrocyclones 114, 214 and 514 at the end of each of chains A, B and C respectively.

In the embodiment depicted in FIG. 6, each of the three chains A, B and C contain the same components, agglomeration sections 101, 501 and 201 receiving a minor portion of the flow of pregnant liquor, and growth sections 102, 202, and 502 receiving the major portion of the flow of pregnant liquor. In chain C, the agglomeration section 201 is seeded with fine particles separated by classifier 113. The growth section 202 is seeded with a portion of the coarse particles separated in the underflow from hydrocyclone 214. The remainder of the particles in the underflow of hydrocyclone 214 are sent on to the second chain B, and are fed to both the agglomeration section 501 and growth section 502. At the end of chain B, the particles in the slurry are separated by hydroclone 514 into a fine portion in the overflow, which is next forwarded to classifier 113 and the coarse portion in the underflow.

The coarse particles are returned in part to the growth section 502 of chain B, and in major part to both the agglomeration 101 and growth 102 sections of chain A. The slurry exiting from chain A is passed through hydrocyclone 114 to separate the fine particles which are sent to classifier 113, and the coarse particles, which constitute the product. A portion of this can be returned to the growth section 102 of chain A for further processing.

In other words, the embodiment of the method of the present invention in connection with FIG. 6, comprises taking the finest particles from the classifier, and treating these particles in the agglomeration section 210 of chain C with a minor portion of pregnant liquor, then combining the resulting slurry with more pregnant liquor, and in the growth stage adding as seed the coarser particles, which is recycled product of this stage. After this, the product slurry is separated from the fine particles which are sent to the large classifier 113; the coarser particles are sent to the agglomeration stage 501 of the following chain B, where a slurry is formed and recombined with the major stream in the growth stage. The growth stage can be seeded with product from chain C or with recycled coarse product from chain B. The sequence should preferably be repeated in chain A, where finally the coarse product particles are either the desired final product, or can be recycled to the growth stage of Chain A.

The following examples, which are provided to illustrate the invention, are given to further facilitate the understanding of the operation of present precipitation system, and are not intended to be limiting. They are examples based on mathematical models, and are not examples of actual operation.

EXAMPLES

For continuity and ease of comparison these results have been generated by a mathematical model of the process which has been previously validated against plant and laboratory results. In all cases the process liquor is at 85% causticity, and contains 6.5 g/l organic carbon, 3.0 g/l sodium oxalate, 1.2 g/l sodium sulphate, and 3.8 g/l sodium chloride as well as other impurities. Ambient temperature is set at 10° C. The seed charges are constant, at 35 g/l fine seed (surface area 0.068 m²/g) to the first precipitator, and 200 g/l coarse seed (surface area 0.032 m²/g) to the fourth precipitator. The circuit includes fifteen mechanically agitated precipitation tanks in series all assumed to be in service, followed by a conventional primary-secondary-tertiary classification system. The first three precipitators are of 11100 m² volume, and the remaining twelve are 4400 m³. In all cases the filtrate flow is 900 m³/hour. 150 m³/hour is delivered to the first precipitator at 81° C., and the remainder is delivered to the fourth tank at 60° C.

Two tables, each showing three variations, have been generated. Table 1 uses filling liquor at 200 g/l caustic and 0.63 alumina to caustic as carbonate ratio. Table 2 uses filling liquor at 250 g/l caustic and 0.70 ratio. Within each table there are three cases, labelled A, B and C.

Case A is a model of the process in accordance with the present invention schematically depicted in FIG. 1 and described herein.

Case B is a model of the process described in Case A, which has physical baffles installed in tanks 5 to 15 in the growth section to retain the solids in these tanks to increase their aluminum trihydroxide concentration to 400 g/l, thereby increasing the strength, and improving the attrition index.

Case C is the same model as case B, with additional in-tank cooling applied to follow an optimum temperature policy.

For each case the in-tank caustic concentration temperature and ratio are reported, together with the soda content ($Na_2O$) of the alumina produced by the hydrate precipitated in that tank.

TABLE 1

Filling Liquor: 200 g/l caustic, 0.63 ratio
17% to Tank 1 at 81° C., 83% to Tank 4 at 60° C.
Fine Seed: 35 g/l to Tank 1 at 0.068 m²/g
Coarse Seed: 200 g/l to Tank 4 at 0.032 m²/g

| | A | | | | B | | | | C | | | |
|---|---|---|---|---|---|---|---|---|---|---|---|---|
| | g/l Caustic | Temp °C. | Ratio | % $Na_2O$ | g/l Caustic | Temp °C. | Ratio | % $Na_2O$ | g/l Caustic | Temp °C. | Ratio | % $Na_2O$ |
| 1 | 203 | 77.7 | .537 | .38 | 203 | 77.7 | .536 | .36 | 204 | 76.5 | .534 | .34 |
| 2 | 205 | 76.7 | .499 | .35 | 205 | 76.7 | .499 | .33 | 205 | 74.5 | .494 | .32 |
| 3 | 206 | 75.6 | .476 | .43 | 206 | 75.6 | .476 | .39 | 206 | 72.1 | .468 | .34 |
| 4 | 206 | 61.3 | .478 | .44 | 206 | 61.4 | .478 | .40 | 206 | 61.5 | .477 | .35 |
| 5 | 207 | 61.4 | .446 | .44 | 208 | 61.6 | .434 | .40 | 208 | 62.2 | .434 | .35 |
| 6 | 208 | 61.4 | .424 | .44 | 209 | 61.6 | .408 | .40 | 209 | 61.5 | .408 | .35 |
| 7 | 208 | 61.3 | .407 | .43 | 209 | 61.6 | .390 | .39 | 210 | 60.2 | .389 | .35 |
| 8 | 209 | 61.2 | .395 | .43 | 210 | 61.5 | .378 | .39 | 210 | 58.8 | .375 | .35 |
| 9 | 209 | 61.1 | .385 | .43 | 210 | 61.4 | .368 | .39 | 211 | 57.3 | .364 | .34 |
| 10 | 210 | 60.9 | .377 | .43 | 210 | 61.2 | .360 | .39 | 211 | 55.9 | .354 | .34 |
| 11 | 210 | 60.8 | .370 | .42 | 211 | 61.0 | .354 | .38 | 211 | 54.5 | .346 | .34 |
| 12 | 210 | 60.6 | .364 | .42 | 211 | 60.9 | .349 | .38 | 212 | 53.3 | .338 | .34 |
| 13 | 210 | 60.4 | .359 | .42 | 211 | 60.7 | .344 | .38 | 212 | 52.1 | .332 | .34 |
| 14 | 211 | 60.3 | .354 | .42 | 211 | 60.5 | .340 | .38 | 212 | 51.1 | .326 | .34 |
| 15 | 211 | 60.1 | .350 | .42 | 211 | 60.3 | .337 | .38 | 212 | 50.1 | .320 | .34 |

TABLE 2

Filling Liquor: 250 g/l caustic, 0.70 ratio
17% to Tank 1 at 81° C., 83% to Tank 4 at 60° C.
Fine Seed: 35 g/l to Tank 1 at 0.068 m²/g
Coarse Seed: 200 g/l to Tank 4 at 0.032 m²/g

| | A | | | | B | | | | C | | | |
|---|---|---|---|---|---|---|---|---|---|---|---|---|
| | g/l Caustic | Temp °C. | Ratio | % $Na_2O$ | g/l Caustic | Temp °C. | Ratio | % $Na_2O$ | g/l Caustic | Temp °C. | Ratio | % $Na_2O$ |
| 1 | 256 | 78.7 | .590 | .39 | 256 | 78.7 | .590 | .38 | 257 | 76.8 | .585 | .38 |
| 2 | 259 | 77.8 | .550 | .36 | 259 | 77.8 | .550 | .34 | 260 | 74.2 | .540 | .35 |
| 3 | 260 | 76.7 | .527 | .47 | 260 | 76.7 | .527 | .44 | 261 | 71.4 | .511 | .40 |
| 4 | 260 | 62.1 | .533 | .50 | 261 | 62.2 | .533 | .47 | 261 | 61.3 | .531 | .43 |
| 5 | 263 | 62.3 | .496 | .49 | 264 | 62.5 | .485 | .46 | 264 | 61.8 | .483 | .43 |
| 6 | 264 | 62.3 | .471 | .49 | 265 | 62.6 | .458 | .45 | 266 | 60.9 | .455 | .43 |
| 7 | 265 | 62.3 | .454 | .48 | 266 | 62.6 | .440 | .45 | 267 | 59.6 | .436 | .42 |
| 8 | 266 | 62.2 | .441 | .48 | 267 | 62.5 | .427 | .44 | 268 | 58.0 | .421 | .42 |
| 9 | 267 | 62.1 | .431 | .47 | 268 | 62.4 | .418 | .44 | 269 | 56.5 | .409 | .41 |
| 10 | 267 | 61.9 | .423 | .47 | 268 | 62.2 | .410 | .43 | 269 | 55.1 | .399 | .41 |
| 11 | 268 | 61.8 | .416 | .47 | 269 | 62.1 | .404 | .43 | 270 | 53.7 | .390 | .41 |
| 12 | 268 | 61.6 | .410 | .46 | 269 | 61.9 | .399 | .43 | 271 | 52.4 | .382 | .41 |
| 13 | 268 | 61.4 | .405 | .46 | 269 | 61.7 | .394 | .43 | 271 | 51.3 | .375 | .41 |
| 14 | 269 | 61.3 | .400 | .46 | 270 | 61.6 | .390 | .42 | 271 | 50.2 | .368 | .40 |
| 15 | 269 | 61.1 | .396 | .46 | 270 | 61.4 | .387 | .42 | 272 | 49.3 | .363 | .40 |

The results contained in the tables demonstrate:

1. From Table 3, that at caustic concentration of 200 g/l the productivity is between 56 and 62 g/l alumina; when the caustic concentration is increased to 250 g/L, productivity is between 76 and 84 g/L. These productivities are significantly higher than those obtained in the traditional American process.

2. Table 3 shows that the productivity is improved by increasing the residence time of the hydrate in the precipitators (Case B) to give a hydrate concentration of 400 g/L; and, applying additional cooling (Case C) so that the temperature of the liquor in tank 15 is reduced to around 50° C.

3. Tables 1 and 2 show that the final product contains less than 0.50% $Na_2O$, and Table 2C shows that in this particular case, the product averages about 0.40% $Na_2O$.

The overall result can be summarized by Table 3.

TABLE 3

| CAUSTIC | PRODUCTIVITY g/l | | |
|---|---|---|---|
| g/l | A | B | C |
| 200 | 56.0 | 58.6 | 62.0 |
| 250 | 76.0 | 78.3 | 84.3 |

We claim:

1. In a process for precipitating aluminum trihydroxide from Bayer process pregnant liquor, the steps of:
   (a) dividing an incoming stream of the pregnant liquor into a major portion and a minor portion, said minor portion being not more than 25% by volume of said incoming stream;
   (b) adding to only said minor portion a first particle size fraction of aluminum trihydroxide particles as seed for inducing precipitation of aluminum trihydroxide;
   (c) passing only said minor portion, containing said first seed fraction, through a first reaction circuit comprising at least one vessel under conditions for inducing precipitation and agglomeration of aluminum trihydroxide particles from the liquor, the particles thus precipitated and agglomerated being carried from the first circuit in said minor portion of the stream;
   (d) beyond said first circuit, reuniting said minor portion with said major portion to provide a recombined stream;
   (e) adding to said recombined stream a second particle size fraction of aluminum trihydroxide particles as seed for inducing precipitation of aluminum trihydroxide, said second seed fraction being larger than said first seed fraction in median particle size;
   (f) passing the recombined stream, containing said second seed fraction, through a second reaction circuit comprising at least one vessel under conditions for inducing precipitation and growth of aluminum trihydroxide particles from the liquor, the particles thus precipitated and grown being carried from said second circuit in said recombined stream;
   (g) beyond said second circuit, separating aluminum trihydroxide particles from the recombined stream into a coarse particle size portion, an intermediate portion and a fine particle size portion;
   (h) dividing a second incoming stream of the pregnant liquor into a major portion and a minor portion;
   (i) adding to said minor portion of said second stream a first quantity of the coarse portion from step (g) as seed for inducing precipitation of aluminum trihydroxide;
   (j) passing only said minor portion of said second stream, containing said first quantity of seed, through a third reaction circuit comprising at least one vessel under conditions for agglomerating aluminum trihydroxide particles by precipitation from the liquor, the particles thus agglomerated being carried from the third circuit in said minor portion of the second stream;
   (k) beyond said third circuit, reuniting said minor portion of said second stream with said major portion of said second stream to provide a recombined second stream;
   (l) adding to said recombined second stream a second quantity of seed for inducing precipitation of aluminum trihydroxide;
   (m) passing the recombined second stream, containing said second quantity of seed, through a fourth reaction circuit comprising at least one vessel under conditions for inducing precipitation and growth of aluminum trihydroxide particles from the liquor, the particles thus precipitated and grown being carried from said fourth circuit in said recombined second stream;
   (n) beyond said fourth circuit, separating coarse and intermediate aluminum trihydroxide particles from the recombined second stream, collecting said coarse particles as product, adding said intermediate particles to said fourth circuit as said second quantity of seed;
   (o) combining the remainder of said recombined second stream with said recombined first stream to form a joint stream; and
   (p) recovering fine particles from said joint stream and adding said fine particles to said minor portion in said first circuit.

2. A process in accordance with claim 1 wherein said fine particles are recovered from said joint stream in a classifier and said fine particles are added to said minor portion in said first reaction circuit for use as seed.

3. A process in accordance with claim 2 wherein the step of separating aluminum trihydroxide particles beyond said second and fourth circuits takes place in at least one hydrocyclone.

4. A process in accordance with claim 3 wherein said separating step beyond said second circuit takes place in a first hydrocyclone and said separating step beyond said fourth circuit takes place in a second hydrocyclone.

5. A process in accordance with claim 4 wherein said coarse particles are removed from said first hydrocyclone and returned to said second circuit.

6. A process in accordance with claim 4 wherein said coarse particles are removed from said second hydrocyclone and returned to said first circuit.

7. A process in accordance with claim 4 wherein said coarse particles are removed from said second hydrocyclone and returned to said fourth circuit.

8. A process in accordance with claim 5 wherein said coarse particles are removed from said second hydrocyclone and returned to said fourth circuit.

9. A process in accordance with claim 4 further comprising passing the stream from said first hydrocyclone and said second hydrocyclone to a classifier for separating fine particles for use as a seed fraction in said second circuit.

* * * * *